United States Patent [19]

Mingione

[11] Patent Number: 5,478,587

[45] Date of Patent: Dec. 26, 1995

[54] DESSERT COMPOSITION

[75] Inventor: Armand Mingione, Escondido, Calif.

[73] Assignee: Henry G. Kohlmann

[21] Appl. No.: 109,707

[22] Filed: Aug. 20, 1993

[51] Int. Cl.$^6$ .................................................. A23G 9/02
[52] U.S. Cl. .................... 426/565; 426/566; 426/567; 426/570; 426/583; 426/613
[58] Field of Search ............................... 426/564, 565, 426/566, 567, 570, 613, 583

[56] References Cited

U.S. PATENT DOCUMENTS

| | | | |
|---|---|---|---|
| 4,046,926 | 9/1977 | Gardiner | 426/613 |
| 4,244,981 | 1/1981 | Blake | 426/567 |
| 4,360,535 | 11/1982 | Darling | 426/570 |
| 4,368,211 | 1/1983 | Blake et al. | 426/564 |
| 4,446,164 | 5/1984 | Brog | 426/583 |
| 4,533,560 | 8/1985 | Procunier | 426/564 |
| 4,643,906 | 2/1987 | Pitz | 426/565 |
| 4,744,992 | 5/1988 | Mitchell et al. | 426/29 |
| 4,868,000 | 9/1989 | Tandy | 426/565 |

Primary Examiner—Jeanette Hunter

[57] ABSTRACT

A low fat, substantially cholesterol and lactose free dry dessert combination the base of which comprises a non-dairy creamer, a sweetener, a filler, a stabilizer, a smoother. Various flavors may be added and the composition may be calcium enriched by addition of calcium carbonate. A low calorie mixture is also described. The non-dairy creamer ranges by weight from approximately 14% to 80%. A non-dairy milk replacement my be substituted for all or part of the non-dairy creamer. Sucrose comprises 7% to 45% by weight of sweetener. Sugar substitutes such as aspartame and polydextrose may be used as a substitute for all or part of the sucrose. Whey and whey protein concentrate and maltadextrin are used as a filler. Maltodextrin may be substituted for the whey. A smoother is included to improve the texture of the dessert. The smoother is a blend of xanthan gum and guar gum. Carrageenan gum may be substituted for either xanthan gum or guar gum. Water or fruit juice may be added to the composition and agitated while the mixture is frozen and an ice cream like dessert is achieved. Further dilution results in a tasty beverage.

34 Claims, No Drawings

DESSERT COMPOSITION

BACKGROUND OF THE INVENTION
1. Field of the Invention

This invention relates to an improved composition for use as a frozen dessert.

2. Description of the Prior Art

There are numerous dessert combinations enjoyed by the public including dry compositions in the nature of Gelatin type desserts, and other dry mixes to which water is added to prepare such deserts. A few of these dry combinations have been of the frozen dessert variety as typified by the composition shown in U.S. Pat. No. 4,307,123 to BONDUS. Such frozen dessert compositions use dry milk or non-fat milk as part of the composition in order to make an ice cream like frozen dessert. Such compositions also contain significant amounts of lactose.

Many people are lactose intolerant and it would be desirable to provide a frozen dessert mix which includes little in the way of milk products and derivatives or none at all and is therefore substantially lactose free. It is also desirable to provide a frozen dry dessert mix which when combined with water and frozen has the appearance, texture and melting characteristics of ice cream without the use of milk or milk solids.

In addition, milk and other animal fat compositions are also high in saturated fats, cholesterol and calories. Accordingly, consumption thereof is to be minimized or avoided for health reasons.

BRIEF DESCRIPTION OF THE INVENTION

In accordance with the present invention, it has been discovered that a dry mix can be provided which when combined with water will form a milk or cream like mixture which is low in fat, and containing little or no lactose and is cholesterol free, which when frozen provides an ice cream substitute with the texture, look and feel of ice cream. Further dilution of the dry mix results in a tasty beverage.

This dry mix comprises a composition containing in various alternative mixtures all or part of the following ingredients:

- a powdered non-dairy creamer
- a non-dairy milk substitute
- a dry sweetener
- a dry filler
- a dry stabilizer
- a dry smoother In addition, calcium may be added to aid in the building of strong bones and teeth. The resulting combination provides a milk like product which is cholesterol free and may also be calcium enriched.

DETAILED DESCRIPTION OF THE INVENTION

In accordance with the present invention, the dry mix can be provided which when combined with water will form a milk or cream like mixture suitable for freezing or providing a healthful beverage which is low in polyunsaturated fat, free of cholesterol, low in calories and containing little or no lactose.

The instant invention based upon non-dairy creamers such as taught in U.S. Pat. No. 4,046,926 which is incorporated herein by reference and other creamers which by way of example typically include by weight: a partially hydrogenated oil of approximately 50%, corn syrup solids of approximately 20%, sodium caseinate of approximately 10%, mono and diglycerides of approximately 8%, dipotassium phosphate of approximately 2%, sodium silicoaluminate of approximately 2.5% and lecithin of approximately 2.5%. Some amount of silicon dioxide may also be included. Commercial nondairy creamers can also include other artificial colors and flavors. The non-dairy creamer is preferred in the dry form which can be accomplished by spray drying or other methods well known in the art.

Non-dairy creamers are generally not suitable for beverage purposes due to the high fat content as noted in U.S. Pat. No. 4,446,164 page 2 line 56 through 61. However, the instant invention includes a combination of ingredients which when combined with significant amounts of a non-dairy creamer is suitable as a beverage and as a frozen dessert.

Many commercial non-dairy creamers are readily available in a dry form and are suitable for the purpose of this invention and the variations in the various contents thereof are contemplated within the scope of this invention. The preferred non-dairy creamer in dry form is available from Kraft Foods and is identified as RICHMIX * B-7 Nondairy Base. This particular non-dairy creamer includes about 50% partially hydrogenated canola oil as the fat base for the creamer.

It has been discovered that the inclusion of a fat improves color, body and flavor of the mix when water is added. While animal fats add cholesterol, it is well known that several vegetable oils are beneficial to cholesterol levels. The higher the ratio of polyunsaturated fat to saturated fat in the oil the greater the cholesterol-lowering effect.

The following partial table of vegetable oils is representative of the relationship between saturated, monounsaturated and polyunsaturated fats present in various oils. The significance of this table is the ratio of monounsaturated and polyunsaturated fats to saturated fats.

| Type | Percentage Saturated Fat | Percentage Monounsaturated Fat | Percentage Polyunsaturated Fat |
| --- | --- | --- | --- |
| canola oil | 6 | 62 | 32 |
| olive oil | 14 | 77 | 9 |
| peanut oil | 18 | 49 | 33 |
| walunt oil | 9 | 23 | 64 |
| sunflower oil | 11 | 25 | 69 |
| corn oil | 13 | 25 | 62 |
| soybean oil | 15 | 24 | 61 |
| safflower oil | 10 | 13 | 77 |
| cottonseed oil | 27 | 19 | 54 |

While vegetable oils which are high in polyunsaturated fats do lower cholesterol they also tend to lower the level of the protective HDL. However, it has also been determined that Monounsaturated content does not cause a lowering of protective HDL. Accordingly, if optimized cholesterol lowering effects are desired with improved HDL, the higher the ratio of monounsaturated fat to saturated fat in the vegetable oil the better the cholesterol lowering effect.

Canola oil, olive oil, and peanut oil are representative vegetable oils which provide the preferred high concentrations of monounsaturated fat relative to saturated fats (greater than 2 to 1) and therefore provide cholesterol-lowering effects with less impact on protective HDL. It is of course desirable to also have a lower amount of polyunsaturated fats as well. A ratio of greater than 1 to 1 of monounsaturated fat to polyunsaturated fat is preferred. Other such oils may be discovered in the future or processing methods devised to give other oils the desired high ratio of monounsaturated fat to saturated fat and such are contemplated within the scope of this invention.

Some oils such as olive oil may impart an undesirable taste to the product and therefore a light version of the oil may be used.

Canola oil is preferred because it is a partially hydrogenated fat and has a higher ratio of monounsaturated fat to saturated fat when compared to other vegetable oils. In addition, canola oil provides a better texture and flavor when the combination of the instant invention is mixed with water and frozen. This provides an enhanced taste and mouth feel (the similarity to ice cream texture when tasted) in the resulting dessert.

The use of the nondairy creamer from about 8% to 80% dry weight and results in a combination which is low in saturated fat, low in cholesterol, low in calories and contains little or no lactose as compared to combinations containing cream, milk, non-fat milk and low fat milk or animal fats. A preferred range is from about 30% to 45%.

All or part of the non-dairy creamer may be substituted with a non-dairy milk replacement as demonstrated in examples 5 and 6. The amount of non-dairy creamer and non-dairy milk replacement ranges from about 0% to about 75% by dry weight for each ingredient and preferable when used together from about 25% to 35% for each ingredient. It is preferred to use like amounts of the non-dairy creamer and the non-dairy milk replacement when used together.

The non-dairy milk replacement is a formulation which includes: maltodextrin of about 40% by weight, a modified food starch of approximately 16%, a non-dairy creamer of approximately 10%, Lecithin of approximately 8%, corn syrup solids of approximately 8%, sodium caseinate of about 8%, titanium dioxide of approximately 5% and dipotassium phosphate of about 5% all by weight. Maltodextrin comprises about 0.02% monosacharides, 0.03% disaccharides, 0.6% trisaccharides, 0.6% tetrasaccharides; and about 98.3% pentasaccharides.

In order to simulate the bulk of ice cream a filler is included. An inexpensive filler which may be included in the mix is a combination of whey of about 1.5% to about 35% dry weight and whey protein concentrate of about .7% to about 24% dry weight. Whey products are derived from the processing of milk and include whey derived from the manufacture of sweet cheese, such as cheddar, swiss, romano, colby, brick mozzarella as well as acid cheeses such as cottage, cream, and bakers cheeses and the like. Whey is also produced from other milk processing such as churning of butter and the production of casein. Whey is comprised principally of lactose (milk sugar) and of whey protein (primarily lactalbumin and some lactoglobulin) of approximately 10 to 15 percent by weight and the balance being ash and moisture. Another suitable filler is available under the trade name SIMPLESSE which also contains whey.

Although whey contains lactose and is not suitable for lactose intolerant individuals the small amounts used in the instant invention result in a very small amount of lactose actually being present in the resulting dessert. Maltodextrin may be substituted in various combinations as set forth below for the whey thereby eliminating the lactose entirely.

A calcium enriched mix may also be provided by the addition of calcium carbonate in amounts from about 0.6% to about 15% by dry weight. In such case the whey content may be reduced by as much 25% by the addition of a like amount of calcium carbonate. Calcium carbonate unlike the calcium content in milk is readily assimilated by human beings and is a good source of dietary calcium and is very desirable for the building of strong bones and teeth.

The alternative mix provides a resultant dessert either in frozen or drink form which is lactose and cholesterol free but which retains the characteristics desired as described herein.

A sweetener is added to provide appropriate dessert flavor and texture. The sweetener is added in the form of dry sucrose of about 0.03% to 55% by dry weight and from about 2.5% to 37% corn syrup solids. A combination of sucrose and corn syrup solids is used in order to balance the sweetness of the resulting combination in proportion to its bulk and provides a desirable texture and smoothness. If only sucrose were used excessive sweetness would result at the then existing bulk. Additional filler would need to be added to minimize the sweetness in the resulting combination and the final dessert preparation would not have the texture and appearance of ice cream. Similarly, if a minimum bulk non-sugar substitute is used, such as NUTRASWEET (aspartame) and EQUAL (a combination of dextrose with maltodextrin and aspartame as set forth in U.S. Pat. No. 3,492,131) or other sugar substitute with less bulk, a greater amount of filler would be required which a possible adverse impact on mouth feel and texture. It has been discovered that aspartame in the range of 0.01% to 7% by dry weight along with polydextrose or sucrose as a sweetener and SIMPLESSE or maltodextrin as a filler yields a combination which is low in calories without sacrificing bulk and texture as shown in the examples below.

A stabilizer is added in order to ensure that the combination remains in suspension when water is added and provides aeration and emulsifying agents. Use of a stabilizer is well known in the art and any typical stabilizer may be used including vegetable gums and the like.

In addition, a vegetable gum blend of Xanthan and Guar gum is used as a smoother. The ratio of Guar gum to the Xanthan gum in the blend is approximately 0.5%. Such gums are typically used as a stabilizer but in the instant invention a blend of these gums is used to improve the smoothness of the texture of the dessert combination when water is added. The commercially available source of such gum blend is KELCO KOB87 Blend available from Kelco, Division of Merck & Company, Inc. An insufficient amount of such gum blend results in a final product which is too coarse and an excessive amount of gum blend results in a final product which is slimy. It has been discovered while addition of the gum blend in the range of 0.001% to 0.15% is appropriate dependent upon the other ingredients. Carragheenin gum may be substituted in whole or in part for the blend. Various examples of the adjustment of the range of the gum blend and other contents is provided below.

The creaminess of the final product can be adjusted by measured addition of water. Less water added the creamer the dessert although less final bulk is realized. In order to prepare the dessert for freezing, water is mixed with the powdered product to form a liquid mixture containing about 30% to 70% water by volume. If a beverage is desired the mixture should be diluted to taste or to approximately double that desired for the frozen dessert.

Ice cream and ice cream products contain a great deal of air (approximately 30% to 100% by volume) which is introduced while the product is in the process of being frozen. This results in a significant increase in volume know in the art as overrun. The instant combination when combined with water is very much like ice cream in a liquid form. The final frozen dessert product is made by continually agitating the liquid mixture in order to introduce air in a typical ice cream making machine or similar device while the mixture is being frozen and achieving an adequate overrun. When frozen the mixture forms an ice cream like product which has the advantages heretofore discussed and may be easily spooned regardless of the length of storage unlike ice cream which may become rock hard on freezing.

Before or after adding water, various flavorings may be added to taste. In the case of such flavorings as chocolate a small amount of salt may also be added to enhance the flavor.

The following examples show the preferred dry combinations and the range of variation which can be utilized in the desert combination.

Various fruit juices may be substituted for a like all or part of the water when rendering the mixture to a liquid form.

The following examples illustrate various combinations of the instant invention and the ranges of ingredients applicable thereto:

| Content | Preferred Percentage by dry wt. | Range of Percentage by Dry Weight | |
|---|---|---|---|
| | | From | To |
| EXAMPLE 1 - SUGAR BASE MIX | | | |
| Non Dairy Creamer | 43.86% | 14.00% | 60.00% |
| Sucrose | 29.24% | 8.00% | 45.00% |
| Corn Syrup Solids | 11.70% | 2.50% | 30.00% |
| Whey | 10.23% | 1.50% | 35.00% |
| Whey Protein Concentrate | 2.92% | 0.70% | 24.00% |
| Xanthan/Guar Gum Blend | 0.15% | 0.01% | 0.29% |
| Stabilizer | 1.90% | 0.29% | 5.00% |
| EXAMPLE 2 - SUGAR BASE MIX WITH CALCIUM | | | |
| Non Dairy Creamer | 42.98% | 14.33% | 57.31% |
| Sucrose | 28.65% | 8.60% | 42.98% |
| Corn Syrup Solids | 11.46% | 2.87% | 28.65% |
| Whey | 9.17% | 1.43% | 34.38% |
| Whey Protein Concentrate | 2.87% | 0.72% | 22.92% |
| Xanthan/Guar Gum Blend | 0.14% | 0.00% | 0.43% |
| Stabilizer | 1.86% | 0.14% | 4.30% |
| Calcium Carbonate | 2.87% | 1.00% | 11.46% |
| EXAMPLE 3 - LOW SUGAR MIX | | | |
| Non Dairy Creamer | 41.74% | 8.70% | 78.26% |
| Sucrose | 17.39% | 3.48% | 52.17% |
| Corn Syrup Solids | 13.91% | 3.48% | 34.78% |
| Aspartame | 0.17% | 0.02% | 6.96% |
| SIMPLESSE | 24.35% | 1.74% | 41.74% |
| Xanthan/Guar Gum Blend | 0.17% | 0.03% | 0.52% |
| Stabilizer | 2.26% | 1.74% | 6.96% |
| EXAMPLE 4 - LOW-SUGAR BASE MIX WITH CALCIUM | | | |
| Non Dairy Creamer | 34.06% | 14.19% | 70.96% |
| Sucrose | 28.38% | 5.68% | 51.09% |
| Corn Syrup Solids | 11.35% | 2.84% | 36.90% |
| Aspartame | 0.09% | 0.01% | 2.84% |
| SIMPLESSE | 19.87% | 5.68% | 56.77% |
| Xanthan/Guar Gum Blend | 0.14% | 0.01% | 0.43% |
| Stabilizer | 1.85% | 0.28% | 5.68% |
| Calcium Carbonate | 4.26% | 0.63% | 14.19% |
| EXAMPLE 5 - LOW-SUGAR BASE WITH NON-DAIRY | | | |

| Content | Preferred Percentage by dry wt. | Range of Percentage by Dry Weight | |
|---|---|---|---|
| | | From | To |
| MILK REPLACEMENT | | | |
| Non-Dairy Milk Replacement | 27.32% | 0.00% | 68.31% |
| Non Dairy Creamer | 27.32% | 0.00% | 68.31% |
| Sucrose | 19.13% | 5.46% | 49.18% |
| Corn Syrup Solids | 10.93% | 2.73% | 35.52% |
| Aspartame | 1.09% | 0.01% | 2.73% |
| SIMPLESSE | 8.20% | 2.73% | 54.64% |
| Xanthan/Guar Gum Blend | 0.14% | 0.01% | 0.41% |
| Stabilizer | 1.78% | 0.27% | 5.46% |
| Calcium Carbonate | 4.10% | 0.60% | 13.66% |
| EXAMPLE 6 - LOW SUGAR BASE WITH CALCIUM & NON-DAIRY MILK REPLACEMENT | | | |
| Non-Dairy Milk Replacement | 30.06% | 0.00% | 75.14% |
| Non Dairy Creamer | 30.06% | 0.00% | 75.14% |
| Polydextrose | 21.04% | 6.01% | 54.10% |
| Sucrose | 0.09% | 0.03% | 0.30% |
| Aspartame | 0.12% | 0.01% | 3.01% |
| Maltodextrin | 12.02% | 3.01% | 39.07% |
| Xanthan/Guar Gum Blend | 0.15% | 0.01% | 0.45% |
| Stabilizer | 1.95% | 0.30% | 6.01% |
| Calcium Carbonate | 4.51% | 0.66% | 15.03% |

The above description and examples may be modified to produce a variety of imitation ice cream like desserts and beverages which come within the scope of this invention.

Having thus described the invention what is claimed is:

1. A non-dairy composition useful in the preparation of a frozen dessert containing a non-dairy creamer comprising:
   (a) from about 14.00% to 78.26% by dry weight of a non-dairy creamer,
   (b) from about 3.48% to 52.17% by weight of a sweetener,
   (c) from about 2.5% to 42.98% by weight of a filler,
   (d) from about 0.14% to 6.96% by weight of a stabilizer, and
   (e) from about 0.01% to 0.29% by weight of a smoother.

2. The non-dairy composition of claim 1 wherein the sweetener is sucrose with additives selected from the group consisting of:
   (a) corn syrup solids,
   (b) aspartame,
   (c) polydextrose,
   (d) corn syrup solids and aspartame, and
   (e) polydextrose and aspartame.

3. The non-dairy composition of claim 1 wherein the sweetener is polydextrose with additives selected from the group consisting of:
   (a) corn syrup solids,
   (b) aspartame,
   (d) corn syrup solids and aspartame.

4. The non-dairy composition of claim 1 wherein the filler is maltodextrin.

5. The non-dairy composition of claim 1 wherein the smoother comprises a vegetable gum.

6. The non-dairy composition of claim 4 wherein the smoother comprises a gum selected from the group consisting of:
   (a) xanthan gum,
   (b) guar gum, a blend of xanthan gum and guar gum, and (d) carrageenan gum.

7. The non-dairy composition of claim 1 further comprising:
   (a) a source of dietary calcium.

8. The non-dairy composition of claim 1 further comprising:
   (a) a partially hydrogenated vegetable oil having a ratio of monounsaturated fat to saturated fat of greater than 2 to 1 and a ratio of monounsaturated fat to polyunsaturated fat of greater than 1 to 1.9.

9. The non-dairy composition of claim 8 wherein said hydrogenated vegetable oil may be selected from the group consisting of:
   (a) olive oil, and
   (b) canola oil.

10. The non-dairy composition of claim 8 including added water, said water comprising from about 50% to about 70% of the weight of the combination.

11. The non-dairy composition of claim 8 including added fruit juice, said fruit juice comprising from about 50% to about 70% of the volume of the combination.

12. A non-dairy composition as described in claim 1 further comprising:
   (a) about 43% by dry weight of a non-dairy creamer having at least 50% canola oil,
   (b) about 30% by weight of sucrose,
   (c) about 11% by weight of corn syrup solids,
   (d) a filler,
   (e) a stabilizer, and
   (f) a smoother.

13. A non-dairy composition as described in claim 1 further comprising:
   (a) about 42% by dry weight of a non-dairy creamer having not less than about 50% by weight of canola oil,
   (b) about 17% by weight of sucrose,
   (c) about 14% by weight corn syrup solids,
   (d) about 0.17% by weight aspartame,
   (e) about 24% by weight maltodextrin,
   (f) a filler,
   (d) a stabilizer, and
   (e) a smoother.

14. A non-dairy composition as described in claim 1 further comprising:
   (a) about 34% by dry weight of a non-dairy creamer,
   (b) about 28% by weight of sucrose,
   (c) about 11% by weight corn syrup solids,
   (d) about 0.09% by weight aspartame,
   (e) about 20% by weight maltodextrin
   (f) about 4% by weight calcium carbonate,
   (g) a filler,
   (h) a stabilizer, and
   (I) a smoother.

15. A non-dairy composition as described in claim 1 further comprising:
   (a) about 27% to 40% by dry weight of a non-dairy creamer having not less than about 50% by weight of canola oil,
   (b) about 19% by weight of sucrose
   (c) about 11% by weight of corn syrup solids,
   (d) about 1% by weight of aspartame,
   (e) about 12% by weight of maltodextrin,
   (f) a filler,
   (d) a stabilizer, and
   (e) a smoother.

16. A non-dairy composition useful in the preparation of a frozen dessert containing a non-dairy creamer comprising:
   (a) from about 14.00% to 68.31% by dry weight of a non-dairy creamer,
   (b) from about 3.48% to 52.17% by weight of a sweetener,
   (c) from about 2.5% to 42.98% by weight of a filler,
   (d) from about 0.14% to 6.96% by weight of a stabilizer, and
   (e) from about 0.01% to 0.41% by weight of a smoother comprising a blend of xanthan and guar gum.

17. The non-dairy composition of claim 14 wherein the sweetener further comprises from about 5.46% to 49.18% by weight of sucrose and an additional sweetener selected from the group consisting of:
   (a) from about 2.84% to 51.09% by weight of corn syrup solids,
   (b) from about 0.01% to 3.01% by weight of aspartame,
   (c) from about 6.01% to 54.1% by weight of polydextrose
   (d) from about 2.84% to 36.9% by weight of corn syrup solids and from about 0.01% to 2.84% by weight of aspartame
   (e) from about 6.01% to 54.1% by weight of polydextrose and from about 0.01% to 2.84% by weight of aspartame.

18. The non-dairy composition of claim 14 wherein the sweetener is polydextrose with additives selected from the group consisting of:
   (a) corn syrup solids,
   (b) aspartame,
   (d) corn syrup solids and aspartame.

19. The non-dairy composition of claim 16 wherein the filler is maltodextrin.

20. The non-dairy composition of claim 16 wherein the smoother comprises a vegetable gum:

21. The non-dairy composition of claim 20 wherein the smoother comprises:
   (a) xanthan gum,
   (b) guar gum,
   (c) a blend of xanthan gum and guar gum, and
   (d) carrageenan.

22. The non-dairy composition of claim 16 further comprising:
   (a) a source of dietary calcium.

23. The non-dairy composition of claim 16 further comprising:
   (a) a partially hydrogenated vegetable oil having a ratio of monounsaturated fat to saturated fat of greater than 2 to 1 and a ratio of monounsaturated fat to polyunsaturated fat of greater than 1 to 1.

24. The non-dairy composition of claim 23 wherein said hydrogenated vegetable oil may be selected from the group consisting of:
   (a) peanut oil,
   (b) olive oil, and
   (c) canola oil.

25. The non-dairy composition of claim 23 further comprising:
   (a) a vegetable oil having a ratio of monounsaturated fat to saturated fat of greater than 2 to 1 and a ratio of monounsaturated fat to polyunsaturated fat of greater than 1 to 1.

26. The non-dairy composition of claim 25 including added water, said water comprising from about 50% to about 70% of the weight of the combination.

27. The non-dairy composition of claim 25 including added fruit juice, said fruit juice comprising from about 50% to about 70% of the volume of the combination.

28. A non-dairy composition useful in the preparation of a frozen dessert comprising:
 (a) from about 25% to about 70% by weight of hydrogenated oil,
 (b) from about 10% to about 25% by weight of corn syrup solids,
 (c) a sweetener,
 (d) a filler,
 (e) a stabilizer, and
 (f) a smoother.

29. The non-dairy composition of claim 28 wherein the sweetener comprises:
 (a) sucrose
 (b) polydextrose and
 (c) aspartame.

30. The non-dairy composition of claim 28 wherein the filler comprises from 3% to 40% maltodextrin.

31. The non-dairy composition of claim 28 wherein the smoother comprises a vegetable gum.

32. The non-dairy composition of claim 30 wherein the smoother is selected from the group consisting of:
 (a) xanthan gum,
 (b) guar gum,
 (c) carrageenan gum, and
 (d) a xanthan and guar gum blend.

33. The non-dairy composition of claim 28 further comprising:
 (a) a source of calcium.

34. The non-dairy composition of claim 28 including added water comprising from about 30% to about 70% of the volume of the combination.

* * * * *

UNITED STATES PATENT AND TRADEMARK OFFICE
CERTIFICATE OF CORRECTION

PATENT NO. : 5,478,587
DATED : December 26, 1995
INVENTOR(S) : Armand Mingione

It is certified that error appears in the above-indentified patent and that said Letters Patent is hereby corrected as shown below:

At column 5 Line 67, the title "EXAMPLE 5-LOW SUGAR BASE WITH NON-DAIRY" Remove and insert at colmn 6 line one. After the word "dairy insert the word milk.

At column 6 remove line 7 [MILK REPLACEMENT].

At column 6 line 67 after the word "gum" remove [ a blend of xanthan gum and guar gum ]

At column 6 line 68 insert (c) a blend of xanthan gum and guar gum.

At column 7 line 9 after the word "and" remove a ratio of monosaturated fat to polyunsaturated fat of greater than 1 to 1.9.

At column 7 line 10 insert [(b) a ratio of monosaturated fat to polyunsaturated fat of greater than 1 to 1.9]

At column 7 line 18 after the word "the" remove the word weight and insert the word [volume]

At column 7 line 43 remove[(d)]insert (g). Line 44 remove[(e)]insert (h) line 57 remove [(I)] insert (i).

UNITED STATES PATENT AND TRADEMARK OFFICE
CERTIFICATE OF CORRECTION

PATENT NO. : 5,478,587
DATED : December 26, 1995
INVENTOR(S) : Armand Mingione

It is certified that error appears in the above-indentified patent and that said Letters Patent is hereby corrected as shown below:

At column 8 line 2 remove [(d)] insert <u>(g)</u>. Line 3 remove[<u>(e)</u>]insert <u>(h)</u>.

Signed and Sealed this

Twenty-second Day of July, 1997

Attest:

BRUCE LEHMAN

*Attesting Officer*  *Commissioner of Patents and Trademarks*